United States Patent

Newland

[11] Patent Number: 5,161,940
[45] Date of Patent: Nov. 10, 1992

[54] ANNULAR SUPPORT

[75] Inventor: Allan B. Newland, St. Lambert, Canada

[73] Assignee: Pratt & Whitney Canada, Inc., Longueuil, Canada

[21] Appl. No.: 718,744

[22] Filed: Jun. 21, 1991

[51] Int. Cl.$^5$ .............................................. F01D 25/16
[52] U.S. Cl. ..................................... 415/142; 415/229
[58] Field of Search ................... 415/134, 135, 174.2, 415/229, 142

[56] References Cited

U.S. PATENT DOCUMENTS

| | | | |
|---|---|---|---|
| 3,421,686 | 1/1969 | Copin et al. | 415/142 |
| 4,457,667 | 7/1984 | Seibert et al. | 415/229 |
| 4,979,872 | 12/1990 | Myers et al. | 415/142 |

FOREIGN PATENT DOCUMENTS

| | | | |
|---|---|---|---|
| 601570 | 7/1960 | Canada | 415/142 |
| 975879 | 12/1951 | France | 415/136 |
| 926947 | 5/1963 | United Kingdom | 415/142 |

Primary Examiner—Edward K. Look
Assistant Examiner—Michael S. Lee
Attorney, Agent, or Firm—Troxell K. Snyder

[57] ABSTRACT

An annular support (22) accommodates differential thermal growth between first and second support rings (24, 26). The support (22) prevents relative axial, circumferential lateral and bending movement between the rings (24, 26), while allowing uniform differential radial expansion and contraction.

6 Claims, 2 Drawing Sheets

ANNULAR SUPPORT

FIELD OF THE INVENTION

The present invention relates to an annular support for accommodating differential thermal growth between two linked, annular, structures.

BACKGROUND ART

The problem of differential thermal growth in axial flow gas turbine engines is a continuing design consideration. One particular area of the engine in which such growth must be accommodated occurs in the hot section wherein the structure contacting the annular hot gas flow path must be supportively linked to the concentric, axially disposed rotor bearing housing which is maintained at a relatively cool temperature. As the engine experiences a start-up and operation cycle, the temperatures of the hot structure and the axially disposed bearing housing may differ by 1000° F. or more at various times during the operating cycle.

Prior art structures to accommodate the differential thermal expansion between these two portions of the engine have included a variety of flexible, sliding, and other arrangements. An additional design constraint on such supports arises from the need to accommodate differential thermal expansion in the radial direction, while prohibiting relative movement in the circumferential, axial, and lateral directions. This is particularly true when the bearing housing, and hence the enclosed bearings, are supported by structures disposed or heated by the annular gas path. In such structures, it is essential to maintain a fixed axial, circumferential, and lateral spacing between the supporting and supported components, while still freely accommodating the uniform radial thermal differential displacement.

SUMMARY OF THE INVENTION

The present invention provides an annular support for accommodating thermal differential expansion between coaxial annular structures in a gas turbine engine or the like. The support permits uniform radial displacement between the coaxial structures while restraining against relative axial, circumferential, lateral and bending movement.

According to the present invention, the support includes first and second axially spaced coaxial support rings or flanges connected by a plurality of elongated transfer members spaced equally about the circumference of the rings. The transfer members are configured so as to have first and second cross-sectional bending moments of inertia, with the second moment of inertia being at least an order of magnitude greater than the first moment of inertia.

The transfer members are oriented with the axis defining the first moment of inertia of each transfer member lying tangent to the circumference of the annular support rings. Thus, the transfer members are relatively easily flexed radially as one ring or the other moves radially, but are relatively inflexible for attempted lateral or circumferential displacement in the local circumferential plane.

Due to the preferential orientation of the moment of inertia in the transfer members, the annular support according to the present invention prevents most relative movement between the first and second rings, while permitting uniform differential radial expansion typically caused by differential thermal conditions. As the radial expansion is accommodated by elastic bending in the transfer members, the annular support according to the present invention avoids any occurrence of high stress levels in the support material thereby reducing the likelihood of premature wear of the support. A further feature of the support according to the present invention is the provision of radial and axial passageways through the support for accommodating the transfer of various engine services, such as lubrication, cooling air, etc., that may be required or desirable in a gas turbine engine. According to one embodiment of the present invention, trapezoidal openings are defined in the support by the transfer members which are arranged so as to approximate a truncated cone between the axially spaced first and second rings. In this embodiment, axially extending conduits as well as radially extending conduits can pass through the annular support for the purpose of supplying lubricants or cooling air to the supported bearings or other interior components.

DETAILED DESCRIPTION

Figure 1:
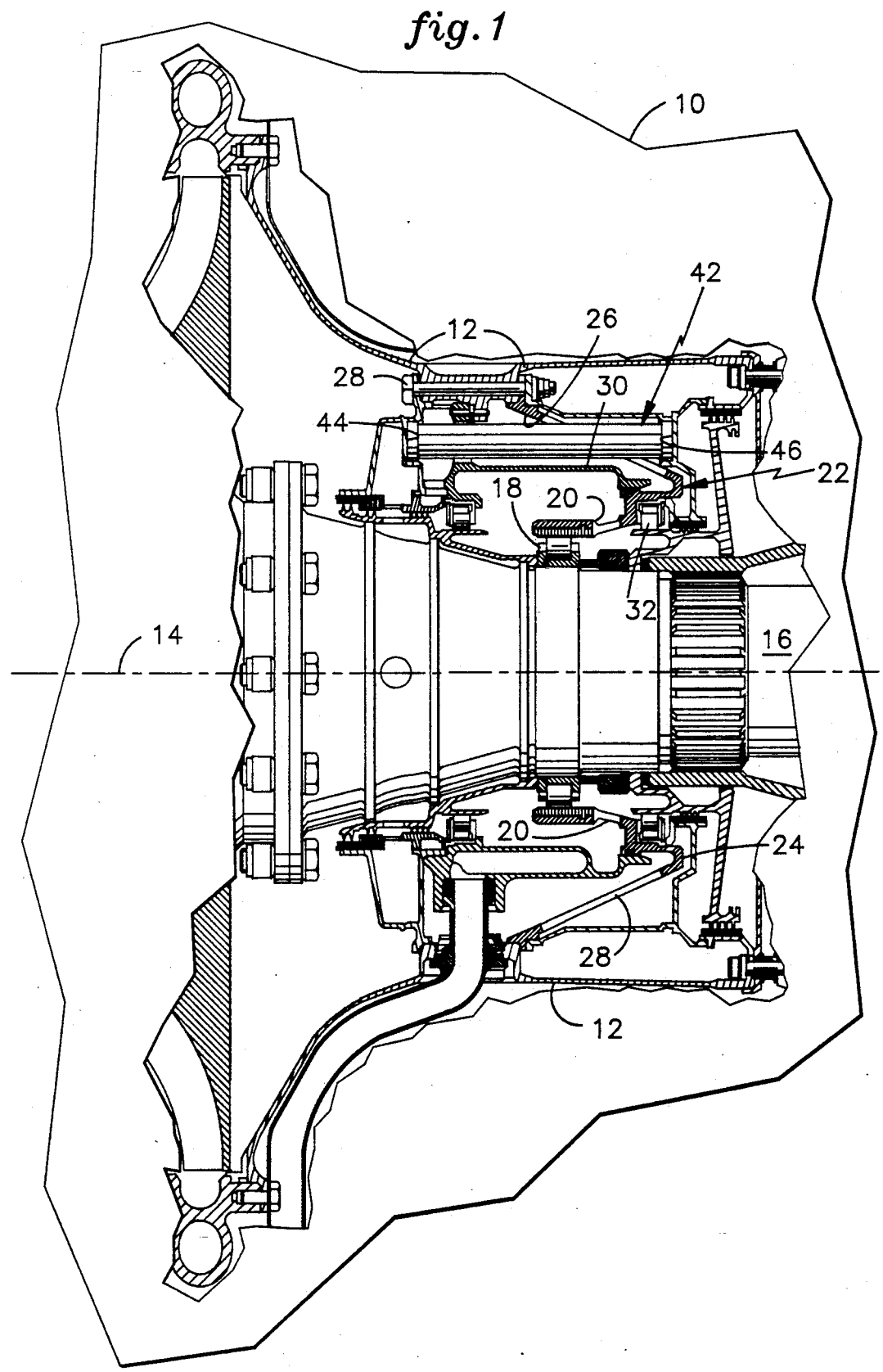
FIG. 1 shows a partial engine cross-section in showing the annular support according to the present invention.

Referring to the drawing figures, and in particular to FIG. 1, a portion 10 of the hot section of a gas turbine engine is shown in axial cross-section. The hot section includes an annular, inner case wall 12 which defines the radially inward flow boundary of the annular hot gas stream which flows through the combustor section and turbine section (not shown) of the gas turbine engine. Concentrically disposed about the engine axis 14 is the main rotor shaft 16 which is supported by main bearings 18.

Main bearings 18 are disposed between the shaft 16 and an annular bearing race 20 which must be supported securely within the engine in order to properly position the rotor shaft 16. The annular bearing race 20 is in turn connected to a first support ring 24 of the annular support 22 according to the present invention.

Annular support 22 includes the first support ring 24, an axially spaced second support ring 26, and a plurality of elongated transfer members 28 which extend between the first and second rings 24, 26. The second support ring 26 is secured to the hot flow boundary structure 12 by means of a bolted connection 28 or the like.

During operation of the engine, structures contained within the bearing housing 30, which includes the bearing race 20, bearings 18, and annular seals 32, are maintained at a temperature compatible with common lubricating oils used to protect and cool the bearings 18, typically no greater than 350° F. (175° C.). This is to be contrasted with the temperature of the hot gas path defining structure 12 to which the second support ring 26 of the annular support 22 is secured. Such inner flow path structure may reach temperatures in excess of 1000° F. (540° C.) resulting in substantial differential thermal expansion between the first support ring 24 and the second support ring 26 of the annular support 22.

Figure 2:
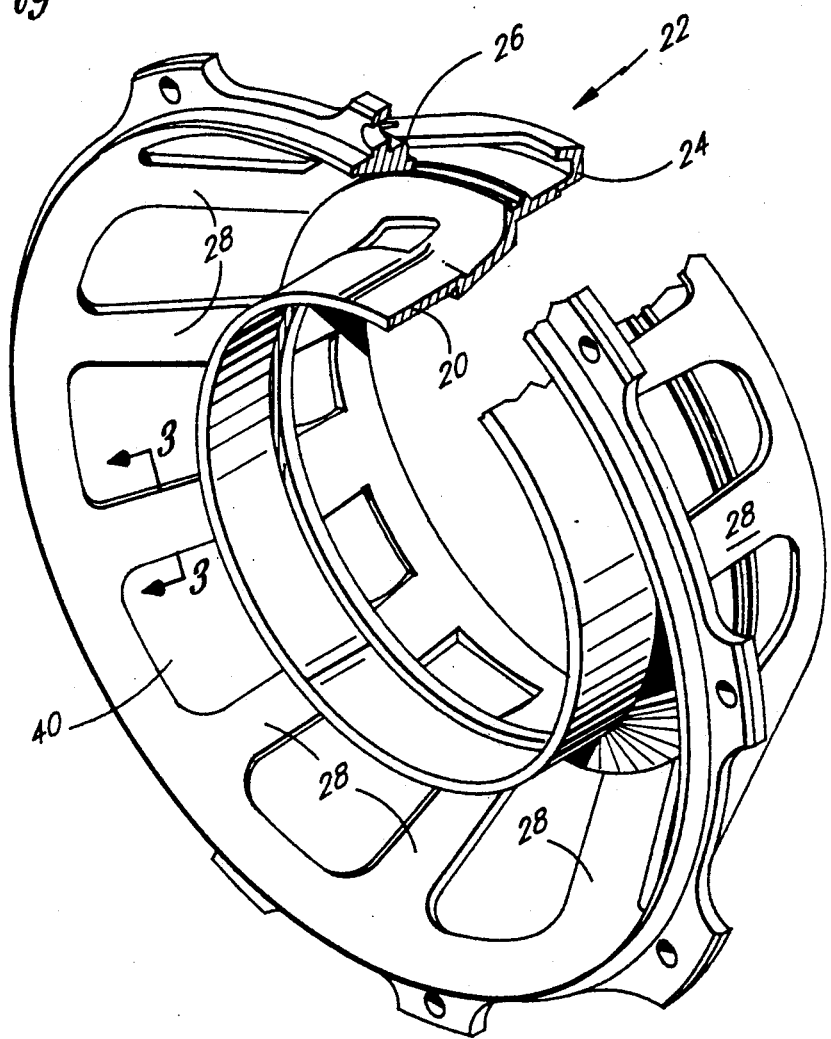
FIG. 2 shows the annular support removed from the surrounding engine structure and arranged in a cutaway perspective.
Figure 3:
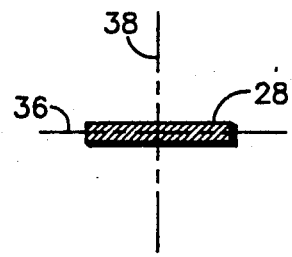
FIG. 3 shows the indicated cross-section of an individual transfer member.

Referring to FIG. 2, the annular support 22 may be seen in cutaway cross-section which shows the inner support ring 24 connected to the bearing race 20 and the outer support ring 26. First and second rings 24, 26 are connected by a plurality of transfer members 28 disposed circumferentially about the support 22 and extending, in this embodiment, both radially and axially. Each transfer member 28 is configured to have a transverse cross-section, an example of which is shown in FIG. 3, having first and second orthogonal geometric moments of inertia so that the axis 36 of the first moment lies parallel to the tangent to the circumference of the annular support, while the second orthogonal moment taken about a second, perpendicular axis 38 is at least an order of magnitude greater than the first moment of inertia taken about the first axis 36.

The benefits of the support according to the present invention should now be apparent. The use of the preferentially arranged moments of inertia of the transfer members 28 results in an inner connecting structure between the first and second support rings 24, 26 in which uniform radial growth or contraction of either ring 24, 26 is easily accommodated with a minimum of stress by flexure of the transfer members 28 about the first moment axis 36. Attempted relative circumferential movement between the rings 24, 26 is prohibited by the members 28 which would be forced to bend about the second moment axis 38 thus, providing a support structure 22 which is highly accommodative to the differential thermal expansion of the rings 24, 26 and highly resistive to relative circumferential movement therebetween. With regard to lateral movement, i.e. attempted off-axis displacement of one ring relative to the other, the supporting web of transfer members 28 reacts similar to a spoked wheel in which the entire structure 22 is resistive to relative movement between the rings 24, 26 which would induce nonconcentricity between the rings.

It is important to note that the radial flexibility of the support ring 22 according to the present invention is achievable only when first and second support rings 24, 26 are axially spaced thereby allowing the transfer members 28 to accommodate relative thermal growth by elastic bending about the relatively low first moments of inertia 36. It should further be noted that although the first and second rings 24, 26 are shown in FIGS. 1 and 2 with different diameters, the annular support 22 according to the present invention would work equally well with equivalent diameter support rings.

An additional feature of the support 22 is provided by the openings 40 defined by the transfer members 28. Openings 40, in the embodiment shown in FIGS. 1 and 2, permit the passage of both axial and radial conduits through the support 22 for the purpose of transferring liquids, gases or other services from one section of the engine to another. FIG. 1, for example, shows a conduit 42 for transferring cooling air or the like extending from an upstream end 44 axially through an opening 28 in the support ring 22 to a downstream end 46. A radially oriented conduit for providing lubrication, etc. to the bearing compartment or other structure is also easily accommodated.

It will be further appreciated that the embodiment of the invention shown in FIGS. 1 and 2 arranges the transfer members 28 in the shape of a truncated cone, and further the transfer members 28 will, in this embodiment, define intermediate openings 40 which are roughly trapezoidal in shape. Finally, the means for securing the inner and outer rings 24, 26 to the supported or supporting structures may include the bolted connections 28 as shown in FIG. 1 as well as any of a variety of known means for securing annular structures, such as mating threads, welding, splining, etc.

I claim:

1. An annular support for accommodating differential thermal expansion between a first support ring having a first radius relative to a central axis and a second support ring oriented coaxially with the first ring and spaced axially therefrom, comprising:

a plurality of elongated load transfer members extending between the first ring and the second ring, each transfer member spaced circumferentially from the next adjacent transfer member, and wherein each transfer member is relatively flexible about a first transverse bending axis oriented circumferentially with respect to the central axis, and each transfer member is relatively inflexible about a second transverse bending axis oriented perpendicularly with respect to the first bending axis.

2. The support as recited in claim 1, wherein the bending moment of inertia taken about the second axis is at least an order of magnitude greater than the bending moment of inertia taken about the first axis.

3. The support as recited in claim 1, wherein the diameter of the first ring is not equal to the diameter of the second ring.

4. The support as recited in claim 1, wherein the first ring is secured to the static structure in the hot section of a gas turbine engine and the second ring supports a shaft main bearing of the engine.

5. The support as recited in claim 3, wherein the total of all transfer members and the first and second rings approximate a truncated conic surface.

6. The support as recited in claim 5, wherein the first and second rings and each pair of adjacent transfer members collectively define a trapezoidal opening in the support.

* * * * *